United States Patent
Sohl

(10) Patent No.: US 6,379,290 B1
(45) Date of Patent: Apr. 30, 2002

(54) ELASTIC ROLL AND PROCESS OF PRODUCING THE SAME

(75) Inventor: Carsten Sohl, Denmark (DE)

(73) Assignee: Voith Sulzer Papiertechnik Patent GmbH, Heidenheim (DE)

( * ) Notice: Subject to any disclaimer, the term of this patent is extended or adjusted under 35 U.S.C. 154(b) by 0 days.

(21) Appl. No.: 09/692,324

(22) Filed: Oct. 20, 2000

(30) Foreign Application Priority Data

Oct. 22, 1999 (DE) .......................................... 199 51 038

(51) Int. Cl.⁷ ................................................. B23P 15/00
(52) U.S. Cl. .............................. 492/56; 492/50; 492/53; 29/895.21
(58) Field of Search .............................. 492/50, 53, 56; 29/895

(56) References Cited

U.S. PATENT DOCUMENTS

| | | | |
|---|---|---|---|
| 3,406,248 A | | 10/1968 | Bunish et al. |
| 3,490,119 A | * | 1/1970 | Fukuyama et al. ............ 492/52 |
| 4,466,164 A | | 8/1984 | Tadokoro et al. |
| 5,324,248 A | * | 6/1994 | Quigley .................... 29/895.21 |
| 5,334,124 A | * | 8/1994 | Ohno .......................... 492/50 |
| 5,387,172 A | * | 2/1995 | Habenicht et al. ............. 492/50 |
| 5,776,043 A | * | 7/1998 | Kato et al. ..................... 492/54 |
| 5,784,961 A | * | 7/1998 | Lorig et al. .................. 101/216 |
| 6,315,704 B1 | * | 11/2001 | Sohl ............................. 492/53 |

FOREIGN PATENT DOCUMENTS

| | | |
|---|---|---|
| DE | 1807331 | 6/1970 |
| DE | 3029288 | 3/1981 |
| DE | 9301417.1 | 5/1993 |
| DE | 29722778 | 5/1998 |
| DE | 19714645 | 10/1998 |
| DE | 19736575 | 3/1999 |

OTHER PUBLICATIONS

Gamsjäger, Elastische Kalanderwalzenbezüge auf Basis Faser–Kunstoff–Verbund, *Das Papier*, H.6, pp. 334–336, 338, 343, 344, and 346–348 (1994).

* cited by examiner

Primary Examiner—I Cuda-Rosenbaum
(74) Attorney, Agent, or Firm—Greenblum & Bernstein, P.L.C.

(57) ABSTRACT

Roll for the smoothing paper webs and process for producing roll. The roll includes a hard core, and an elastic covering layer arranged on an outside of the hard core. The covering layer includes a radially outer functional layer and a radially inner connecting layer arranged to couple the functional layer to the hard core. The inner connecting layer and the outer functional layer each include a soft matrix material with embedded fibers. The matrix material of the functional layer includes an elastic material with a damping factor of tan δ less than about 0.02 and the matrix material of the connecting layer includes a damping material with a damping factor of tan δ greater than about 0.05. The process includes forming an outer functional layer with an elastic matrix material having a damping factor of tan δ less than about 0.02 and embedded fibers, forming an inner connecting layer with a damping matrix material having a damping factor of tan δ greater than about 0.05 and embedded fibers, and coupling the outer functional layer to the hard core through the inner connecting layer to form an elastic covering layer on an outside of the hard core.

30 Claims, 1 Drawing Sheet

ELASTIC ROLL AND PROCESS OF PRODUCING THE SAME

CROSS-REFERENCE TO RELATED APPLICATIONS

The present application claims priority under 35 U.S.C. §119 of German Patent Application No. 199 51 038.5, filed on Oct. 22, 1999, the disclosure of which is expressly incorporated by reference herein in its entirety.

BACKGROUND OF THE INVENTION

1. Field of the Invention

The present invention relates to a roll, e.g., for smoothing paper webs, that includes a hard roll core made of, e.g., metal and an elastic layer provided on an outside of the hard roll. The covering layer includes a radially outer functional layer and a radially inner connecting layer arranged to connect the functional layer to the roll core.

2. Discussion of Background Information

Elastic rolls of this kind are used, e.g., in the satining of paper webs. Here, one elastic roll forms, in each case together with a hard roll, a press gap through which the paper web to be treated is guided. While the hard roll has a very smooth surface made of, e.g., steel or chilled cast iron and is responsible for the smoothing of the side of paper web facing it, the elastic roll acts on the opposite side of the paper web to effect a homogenizing and compacting of the paper web in the nip. The order of magnitude of the rolls ranges from lengths of about 3–12 m and diameters from about 450–1500 mm. They can withstand line forces of up to about 600 N/mm and compressive stresses of up to about 130 N/mm$^2$.

As the trend in paper manufacturing is toward performing satining in an online operation, i.e., toward guiding the paper web exiting the paper machine or coating machine directly through the paper smoothing apparatus (calender), higher demands than previously are made on the rolls of the smoothing apparatus, particularly with respect to temperature resistance. As a result of the high transportation speeds of the paper web required in online operation and the high rotation speeds of the calender rolls associated with this, the nip frequency, i.e., the frequency with which the covering is compressed and relieved of its load again, is increased, which in turn leads to increased roll temperatures. These high temperatures arising in online operation lead to problems which can even lead to the destruction of the plastic coatings in known elastic rolls. With known plastic coatings, maximum temperature differences of around 20° C. are permissible over the width of the roll and, the plastics conventionally used for the coating have a substantially higher coefficient of thermal expansion than the conventionally used steel rolls or chilled cast-iron rolls so that high axial stresses occur between the steel roll or the chilled cast-iron roll and the plastic coating associated with it due to an increase in temperature.

So-called hot spots, at which a peeling or even a breaking open of the plastic layer occurs, arise dine to these high stresses in conjunction with hot regions occurring particularly in spot form.

These hot spots can occur when, in addition to the mechanical stresses and the relatively high temperature, crystallization spots exist in the form of, e.g., defective adhesive bonds, deposits or above-average recesses in the elastic coating, e.g., due to creases or foreign bodies on the paper web. In these cases, the temperature to the crystallization spots can increase from the normal about 80° C.–90° C. to more than about 150° C., due to which the above-mentioned destruction of the plastic layer occurs.

To achieve a high service life of the elastic rolls, it must be ensured that the covering layer is not destroyed by either its internal heating, which occurs in operation, or by high local mechanical excessive stresses, which occur in operation.

SUMMARY OF THE INVENTION

The present invention provides a roll of the kind generally mentioned above, in which the risk of the occurrence of hot spots is reduced and high local excessive stresses will also not lead to the destruction of the elastic covering layer.

Accordingly, the present invention includes a roll, similar in general to that mentioned above, in which the inner connecting layer and the outer functional layer each include a soft matrix material with fibers embedded therein. The matrix material of the functional layer is a highly elastic material with a damping factor of tan δ less than about 0.02 and the matrix material of the connecting layer is a highly damping material with a damping factor of tan δ greater than about 0.05. The damping factor tan δ is defined here by the equation tan δ=E'/E", where E represents the modulus of elasticity with its real part E' and its imaginary part E".

In accordance with the invention, the covering layer is split into two partial layers, each of which is optimized for its respective task. While the local excessive stresses are taken up and damped by the highly damping matrix material in the connecting layer, so that the elastic roll is relatively insensitive to high local excessive stresses, the flexibility of the roll surface required for a high quality staining result and the low internal warming of the outer regions of the covering layer are ensured by the highly elastic material of the functional layer.

The matrix material preferably includes a plastic material, e.g., a thermosetting plastic or a thermoplastic. It must be pointed out here that the term "soft" when used in connection with the matrix material, is only to be understood in relation to the outer side of the metal roll, in particular the steel roll, termed as "hard."

The heat dissipation inside the connecting layer is increased and the desired stiffness of the connecting layer is achieved by the fibers embedded in the matrix material of the connecting layer. The same applies to the fibers embedded in the functional layer, such that the heat, which only occurs to a lower degree here due to the highly elastic matrix material, is dissipated essentially completely via the fibers.

In accordance with an advantageous embodiment of the invention, the fiber content of the connecting layer is approximately 40 to 70 vol. %, in particular approximately 50 to 60 vol. %. The fiber content of the functional layer, in contrast, is advantageously approximately 5 to 30 vol. %, in particular approximately 8 to 20 vol. %.

Since the connection layer should have a greater stiffness than the functional layer and, since a higher heat dissipation is required in the radially inner connecting layer, the connecting layer has a higher fiber content than the functional layer.

The connecting layer preferably has a greater radial thickness than the functional layer, with the radial thickness of the connecting layer advantageously being approximately 30 to 70%, in particular approximately 50%, greater than the radial thickness of the functional layer. Suitable values for the radial thickness of the connecting layer can be approximately 8 to 15 mm, preferably approximately 12 mm, and for the radial thickness of the functional layer approximately 5 to 12 mm, preferably approximately 8 mm.

The desired property of the connecting layer with respect to a high capability to take up large local excessive stresses is improved by its greater radial thickness since the large local excessive stresses are greatly damped by the relatively thick connecting layer.

In accordance with another preferred embodiment of the invention, the fibers of the functional layer and/or of the connecting layer have a higher thermal conductivity than the matrix material in which they are embedded. The fibers of the functional layer and/or the connective layer can be made of, e.g., carbon fibers and/or metal fibers.

In this way, it is achieved that the heat occurring inside the functional layer and/or the connecting layer is dissipated fast and safely before the heat occurring can lead to the destruction of the covering layer.

Further, fillers, whose thermal conductivity is, e.g., greater than the thermal conductivity of the matrix material in each case, can advantageously be present in the functional layer and/or connecting layer in addition to the fibers. The fillers can be made of, e.g., carbon and/or metal, preferably in powder or fiber form.

A further improvement in the thermal conductivity of the relevant matrix material is achieved by these fillers.

The present invention is directed to a roll for the smoothing paper webs. The roll includes a hard core, and an elastic covering layer arranged on an outside of the hard core. The covering layer includes a radially outer functional layer and a radially inner connecting layer arranged to couple the functional layer to the hard core. The inner connecting layer and the outer functional layer each include a soft matrix material with embedded fibers. The matrix material of the functional layer includes an elastic material with a damping factor of tan δ less than about 0.02 and the matrix material of the connecting layer includes a damping material with a damping factor of tan δ greater than about 0.05.

In accordance with a feature of the present invention, the hard core can include a metal core. Further, the metal core may include one of a steel and chilled cast iron core.

According to another feature of the invention, the matrix materials have a modulus of elasticity comprising real and imaginary components, and tan δ represents the real component of the modulus of elasticity divided by the imaginary component of the modulus of elasticity.

The matrix material of at least one of the functional layer and the connecting layer may include plastic. The plastic may be one of a thermosetting plastic and a thermoplastic.

Further, the matrix material of at least one of the functional layer and the connecting layer can include a resin/hardener combination.

According to another feature of the invention, a fiber content of the connecting layer can be approximately 40–70 vol. %. The fiber content may be approximately 50–60 vol. %.

Moreover, a fiber content of the functional layer is approximately 5–30 vol. %, and the fiber content can be approximately 8–20 vol. %.

The connecting layer can have a radial thickness greater than a radial thickness of the functional layer. The radial thickness of the connecting layer may be approximately 30–70% greater than the radial thickness of the functional layer. Further, the radial thickness of the connecting layer can be approximately 50% greater than the radial thickness of the functional layer. Still further, the radial thickness of the connecting layer may be approximately 8–15 mm, and the radial thickness of the connecting layer can be approximately 12 mm. The radial thickness of the functional layer may be approximately 5–12 mm, and the radial thickness of the functional layer can be approximately 8 mm.

In accordance with another feature of the instant invention, the fibers of at least one of the functional layer and the connecting layer can have a thermal conductivity higher than a thermal conductivity of the matrix material into which the fibers are embedded.

According to still another feature of the present invention, the fibers of at least one of the functional layer and the connecting layer can include at least one of carbon fibers and metal fibers.

Moreover, fillers can be provided in at least one of the functional layer and the connecting layer. A thermal conductivity of the fillers may be greater than a thermal conductivity of the matrix material. The fillers can include at least one of carbon and metal.

In accordance with a further feature of the invention, fillers can be provided in the functional layer.

The functional layer may include a plurality of layers and the connecting layer can include a plurality of fiber layers.

The connecting layer may include between 10 and 90 fiber layers, and the connecting layer can include between 40 and 50 fiber layers.

The present invention is directed to a roll for the smoothing paper webs. The roll includes a hard c(ore and an elastic covering layer arranged on an outside of the hard core. The covering layer includes a radially outer functional layer and a radially inner connecting layer arranged to couple the functional layer to the hard core. The inner connecting layer includes a damping matrix material with embedded fibers arranged to damp local mechanical stresses, and the outer functional layer includes an elastic matrix material with embedded fibers arranged for satining the paper webs.

In accordance with yet another feature of the instant invention, the outer functional layer may further include fillers arranged to increase a thermal conductivity of the outer functional layer.

The present invention is directed to a process for producing a roll for smoothing paper webs, where the roll includes a hard core. The process includes forming an outer functional layer with an elastic matrix material having a damping factor of tan δ less than about 0.02 and embedded fibers, forming an inner connecting layer with a damping matrix material having a damping factor of tan δ greater than about 0.05 and embedded fibers, and coupling the outer functional layer to the hard core through the inner connecting layer to form an elastic covering layer on an outside of the hard core.

Other exemplary embodiments and advantages of the present invention may be ascertained by reviewing the present disclosure and the accompanying drawing.

BRIEF DESCRIPTION OF THE DRAWING

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
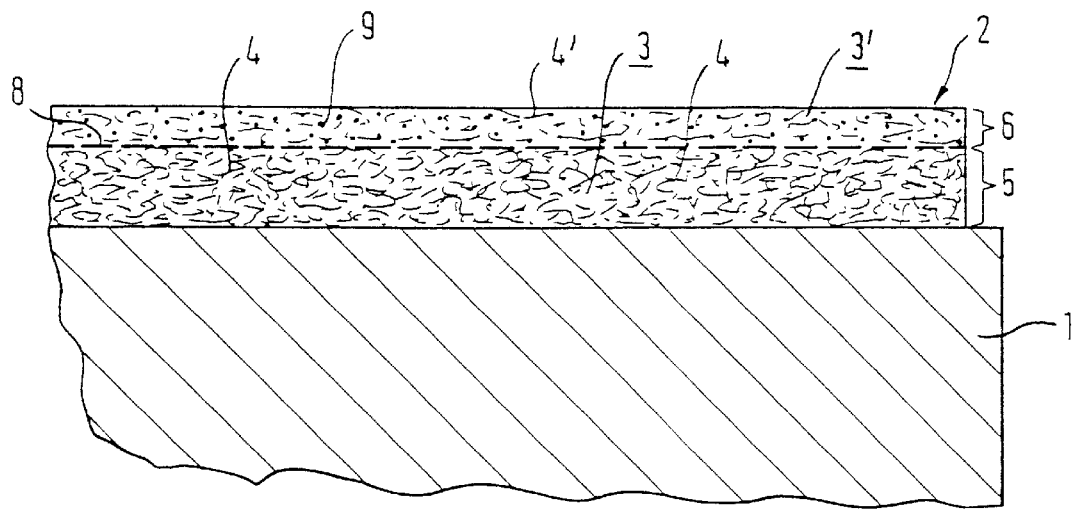
FIG. 1 illustrates a partial longitudinal section through a roll having an elastic covering layer in accordance with the invention.

FIG. 1 shows a part of a roll core 1 cut along the longitudinal direction, made of, e.g., steel or chilled cast iron and an elastic covering 2 provided on an outside of roll core 1, as shown in the cut-away representation.

Covering layer 2 comprises a radially inner connecting layer 5 and a radially outer functional layer 6, which are shown, for the purpose of explanation and illustration, as separated from one another by a broken line 8. Connecting layer 5 has a greater radial thickness than functional layer 6.

Connecting layer 5 is formed of a highly damping matrix material 3, e.g., a resin/hardener combination, into which a plurality of fibers 4 are embedded. Fibers 4 can be, e.g., carbon fibers, metal fibers or a mixture of carbon fibers and metal fibers. The fiber material must generally be suitable to increase both the thermal conductivity and the stiffness of connecting layer 5 relative to a layer consisting only of matrix material 3.

In a similar manner, functional layer 6 is formed of an elastic matrix material 3' into which a plurality of fibers 4' are embedded. The same material conditions apply as discussed above with fibers 4. In addition, fillers 9 are embedded in matrix material 3' to improve the thermal conductivity of functional layer 6. These fillers can be made in powder form and can be, e.g., mineral or metallic fillers.

Matrix material 3' of functional layer 6 has a substantially higher elasticity than matrix material 3 of connecting layer 5. In this way, covering layer 2 has the flexibility required for satining in its radially outer region and the lowest possible internal heating takes place in this region.

As can also be seen from FIG. 1, functional layer 6 has a lower fiber content than connecting layer 5. In this way, functional layer 2 receives its elasticity via highly elastic material 3'. In contrast, connecting layer 5 has a higher stiffness due to the higher fiber content, and, therefore, can take up and damp high local mechanical excessive stresses via highly damping matrix material 3.

Figure 2:
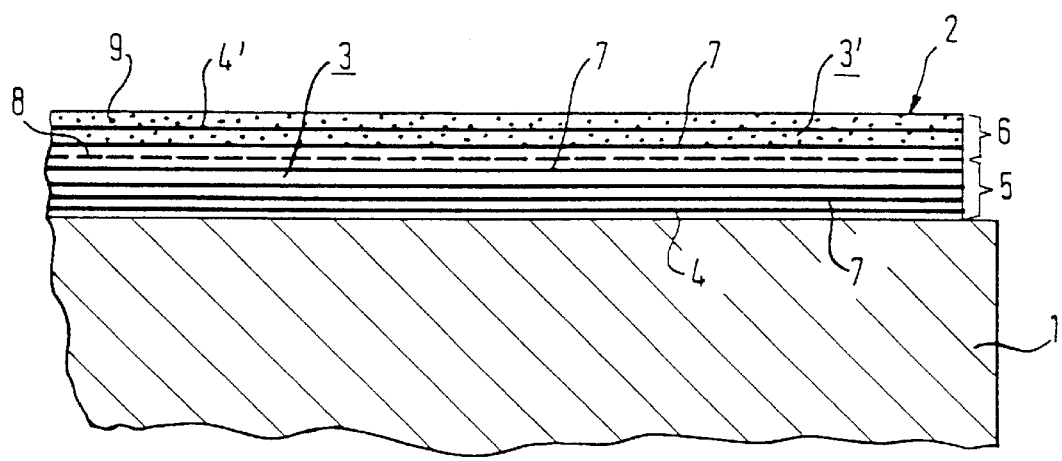
FIG. 2 illustrates another embodiment of a roll made in accordance with the invention in a partial longitudinal section.

In the embodiment shown in FIG. 2, fibers 4 inside covering layer 2 are shown in schematic form as fiber layers 7 extending essentially concentrically or spirally to roll core 1.

Fiber layers 7 can be produced, e.g., by winding fiber rovings onto roll core 1, with it being possible to perform several winding procedures to produce several fiber layers 7 to form covering layer 2. In this case, the fiber content of connecting layer 5 is higher than the fiber content of functional layer 6, and fillers 9 are again provided in functional layer 6 to improve the thermal conductivity of functional layer 6.

The fibers or fiber rovings can be acted upon prior to winding with matrix material in a liquid state, e.g., by being drawn through a matrix bath. However, it is also possible for the fibers or fiber rovings to be wound onto roll core 1 in a dry state and to be soaked with the matrix material during or after winding until they are fully covered thereby.

It is also possible for fiber layers 7 to be produced by winding a fiber fleece, with this being preferred for fiber layers 7 arranged inside functional layer 6. The fibers are usually spread unevenly and are shorter in a fiber fleece than is the case for the winding of fiber rovings. When a fiber fleece is used, functional layer 6 has a higher flexibility than is the case when fiber rovings are used.

While only relatively few fiber layers 7 are depicted in FIG. 2 (for clarity and explanation), covering layer 2 can include, e.g., between 10–90 fibers layers 7, and preferably between 40–50 fiber layers 7.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

REFERENCE NUMERAL LIST

1 Roll core
2 Elastic covering layer
3, 3' Matrix material
4, 4' Fibers
5 Connecting layer
6 Functional layer
7 Fiber layers
8 Broken line
9 Fillers

What is claimed:

1. A roll for the smoothing paper webs comprising:

a hard core;

an elastic covering layer arranged on an outside of said hard core;

said covering layer comprising a radially outer functional layer and a radially inner connecting layer arranged to couple said functional layer to said hard core;

said inner connecting layer and said outer functional layer each comprising a soft matrix material with embedded fibers, wherein said matrix material of said functional layer comprising an elastic material with a damping factor of tan $\delta$ less than about 0.02 and said matrix material of said connecting layer comprising a damping material with a damping factor of tan $\delta$ greater than about 0.05.

2. The roll in accordance with claim 1, wherein said hard core comprises a metal core.

3. The roll in accordance with claim 2, wherein said metal core comprises one of a steel and chilled cast iron core.

4. The roll in accordance with claim 1, wherein said matrix materials have a modulus of elasticity comprising real and imaginary components, and
   wherein tan δ represents the real component of the modulus of elasticity divided by the imaginary component of the modulus of elasticity.

5. The roll in accordance with claim 1, wherein said matrix material of at least one of said functional layer and said connecting layer comprises plastic.

6. The roll in accordance with claim 5, wherein said plastic comprises one of a thermosetting plastic and a thermoplastic.

7. The roll in accordance with claim 1, wherein said matrix material of at least one of said functional layer and said connecting layer comprises a resin/hardener combination.

8. The roll in accordance with claim 1, wherein a fiber content of said connecting layered is approximately 40–70 vol. %.

9. The roll in accordance with claim 8, wherein said fiber content is approximately 50–60 vol. %.

10. The roll in accordance with claim 1, wherein a fiber content of said functional layer is approximately 5–30 vol. %.

11. The roll in accordance with claim 10, wherein said fiber content is approximately 8–20 vol. %.

12. The roll in accordance with claim 1, wherein said connecting layer has a radial thickness greater than a radial thickness of said functional layer.

13. The roll in accordance with claim 12, wherein said radial thickness of said connecting layer is approximately 30–70% greater than said radial thickness of said functional layer.

14. The roll in accordance with claim 13, wherein said radial thickness of said connecting layer is approximately 50% greater than said radial thickness of said functional layer.

15. The roll in accordance with claim 12, wherein said radial thickness of said connecting layer is approximately 8–15 mm.

16. The roll in accordance with claim 15, wherein said radial thickness of said connecting layer is approximately 12 mm.

17. The roll in accordance with claim 12, wherein said radial thickness of said functional layer is approximately 5–12 mm.

18. The roll in accordance with claim 17, wherein said radial thickness of said functional layer is approximately 8 mm.

19. The roll in accordance with claim 1, wherein said fibers of at least one of said functional layer and said connecting layer have a thermal conductivity higher than a thermal conductivity of said matrix material into which said fibers are embedded.

20. The roll in accordance with claim 1, wherein said fibers of at least one of said functional layer and said connecting layer comprise at least one of carbon fibers and metal fibers.

21. The roll in accordance with claim 1, further comprising fillers provided in at least one of said functional layer and said connecting layer.

22. The roll in accordance with claim 21, wherein a thermal conductivity of said fillers is greater than a thermal conductivity of said matrix material.

23. The roll in accordance with claim 22, wherein said fillers comprise at least one of carbon and metal.

24. The roll in accordance with claim 1, further comprising fillers provided in said functional layer.

25. The roll in accordance with claim 1, wherein said functional layer comprises a plurality of layers and said connecting layer comprises a plurality of fiber layers.

26. The roll in accordance with claim 1, wherein said connecting layer comprises between 10 and 90 fiber layers.

27. The roll in accordance with claim 26, wherein said connecting layer/comprises between 40 and 50 fiber layers.

28. A roll for the smoothing paper webs comprising:
   a hard core;
   an elastic covering layer arranged on an outside of said hard core;
   said covering layer comprising a radially outer functional layer and a radially inner connecting layer arranged to couple said functional layer to said hard core;
   said inner connecting layer comprising a damping matrix material with embedded fibers arranged to damp local mechanical stresses;
   said outer functional layer comprising an elastic matrix material with embedded fibers arranged for satining the paper webs.

29. The roll in accordance with claim 28, said outer functional layer further comprising fillers arranged to increase a thermal conductivity of said outer functional layer.

30. A process for producing a roll for smoothing paper webs, the roll including a hard core, the process comprising:
   forming an outer functional layer with an elastic matrix material having a damping factor of tan δ less than about 0.02 and embedded fibers;
   forming an inner connecting layer with a damping matrix material having a damping factor of tan δ greater than about 0.05 and embedded fibers; and
   coupling the outer functional layer to the hard core through the inner connecting layer to form an elastic covering layer on an outside of the hard core.

* * * * *